United States Patent
Yasuzaka (10) Patent No.: US 9,299,502 B2
(45) Date of Patent: Mar. 29, 2016

(54) PRESSURE VALVE FOR ELECTROLYTIC CAPACITOR, AND ELECTROLYTIC CAPACITOR USING SAME

(71) Applicant: NICHICON CORPORATION, Kyoto-shi, Kyoto (JP)

(72) Inventor: Takeshi Yasuzaka, Ono (JP)

(73) Assignee: NICHICON CORPORATION, Kyoto (JP)

( * ) Notice: Subject to any disclaimer, the term of this patent is extended or adjusted under 35 U.S.C. 154(b) by 85 days.

(21) Appl. No.: 14/347,413

(22) PCT Filed: Jun. 26, 2013

(86) PCT No.: PCT/JP2013/067452
§ 371 (c)(1),
(2) Date: Mar. 26, 2014

(87) PCT Pub. No.: WO2014/003038
PCT Pub. Date: Jan. 3, 2014

(65) Prior Publication Data
US 2014/0233156 A1  Aug. 21, 2014

(30) Foreign Application Priority Data
Jun. 28, 2012 (JP) ................. 2012-145508

(51) Int. Cl.
*H01G 9/08* (2006.01)
*H01G 11/80* (2013.01)
(Continued)

(52) U.S. Cl.
CPC .. *H01G 9/12* (2013.01); *H01G 9/08* (2013.01); *H01G 11/78* (2013.01); *H01G 11/80* (2013.01)

(58) Field of Classification Search
CPC .......... H01G 9/08; H01G 11/78; H01G 11/80
USPC ................................. 361/502, 519
See application file for complete search history.

(56) References Cited

U.S. PATENT DOCUMENTS 3,484,817 A * 12/1969 Wood .................. 220/89.2
3,722,734 A *  3/1973 Raidl, Jr. ............. 220/89.2
3,878,440 A *  4/1975 Ando .................. 361/521
(Continued)

FOREIGN PATENT DOCUMENTS

JP    A-11-162798    6/1999
JP    A-2001-15391   1/2001
(Continued)

OTHER PUBLICATIONS

International Search Report issued in International Patnet Application No. PCT/JP2013/067452 dated Aug. 13, 2013.

*Primary Examiner* — Jeremy C Norris
*Assistant Examiner* — Nathan Milakovich
(74) *Attorney, Agent, or Firm* — Oliff PLC (57) ABSTRACT

A pressure valve is made of gas-permeable flexible material, and an actuation portion and a supporter are formed integrally with each other. The actuation portion includes a thin portion and a thick portion provided in an outer region of the thin portion and having a thickness greater than that of the thin portion. When viewed from the direction of the thickness of the actuation portion, the thin portion has a cross-like shape, and the outer edge of the thin portion is shaped to include a plurality of first arcs each protruding toward the inside of the thin portion, and a plurality of second arcs each protruding toward the outside of the thin portion.

6 Claims, 4 Drawing Sheets (51) Int. Cl.
*H01G 11/78* (2013.01)
*H01G 9/12* (2006.01)

(56) References Cited

U.S. PATENT DOCUMENTS

| | | | | |
|---|---|---|---|---|
| 4,803,136 | A | * | 2/1989 | Bowsky ................ B65D 83/70 216/54 |
| 5,160,070 | A | * | 11/1992 | Hibler et al. .................... 60/250 |
| 5,267,666 | A | * | 12/1993 | Hinrichs et al. ............. 220/89.2 |
| 5,455,124 | A | * | 10/1995 | Schollenberger .. B65D 51/1661 220/361 |
| 6,887,614 | B2 | * | 5/2005 | Duprey ............... H01M 2/0421 429/185 |
| 7,195,839 | B2 | * | 3/2007 | Bouffard ............. H01M 2/1223 220/367.1 |
| 8,130,487 | B2 | * | 3/2012 | Shimizu et al. ................ 361/519 |

FOREIGN PATENT DOCUMENTS

| | | | |
|---|---|---|---|
| JP | A-2003-297324 | | 10/2003 |
| JP | A-2004-95457 | | 3/2004 |
| JP | A-2006-108185 | | 4/2006 |
| JP | 2006194350 A | * | 7/2006 |
| JP | 2008010476 A | * | 1/2008 |
| JP | 2009266925 A | * | 11/2009 |
| JP | 2012248906 A | * | 12/2012 |
| SU | 496415 A | * | 2/1976 |
| WO | WO 2011/158822 A1 | | 12/2011 |

* cited by examiner

PRESSURE VALVE FOR ELECTROLYTIC CAPACITOR, AND ELECTROLYTIC CAPACITOR USING SAME

TECHNICAL FIELD

The present invention relates to a pressure valve for an electrolytic capacitor, and an electrolytic capacitor using the pressure valve.

BACKGROUND ART

Technical documents on electrolytic capacitors include Patent Literature 1 specified below. Patent Literature 1 discloses that, to improve the lifetime of an electrolytic capacitor, two valves which are a pressure valve and a gas release valve are provided as valves for releasing internal gas, and in normal use, the internal gas is released as needed through the gas release valve, while in the case of a rapid increase in internal pressure, the pressure valve is actuated (broken) to release the internal gas.

CITATION LIST

Patent Literature

Patent Literature 1: Japanese Unexamined Patent Publication No. 108185/2006 (Tokukai 2006-108185)

SUMMARY OF INVENTION

Technical Problem

However, in Patent Literature 1, the two valves which are the pressure valve and the gas release valve are used to release the internal gas, and therefore the number of parts is larger, leading to the higher cost correspondingly.

One possible way to avoid this problem is to use a single valve, but in this case, it is necessary to decrease the thickness of the valve to release the internal gas generated in normal use.

However, the decrease in the thickness of the valve facilitates the breakage of the valve, and the lifetime of the electrolytic capacitor cannot be improved.

An object of the present invention is to provide: a pressure valve for an electrolytic capacitor, with which valve the lifetime of the electrolytic capacitor is improved while restraining the number of parts for releasing the internal gas; and an electrolytic capacitor using the pressure valve.

Solution to Problem

In order to achieve the above-described object, according to a first aspect of the present invention, there is provided a pressure valve for an electrolytic capacitor, the pressure valve provided to a sealing member which seals a case accommodating a capacitor element in the electrolytic capacitor, the pressure valve configured to release gas generated in the case, the pressure valve including an actuation portion including a thin portion and a thick portion which is provided in an outer region of the thin portion and has a thickness greater than that of the thin portion. In the actuation portion, at least the thin portion is made of gas-permeable material, and when viewed from a direction of a thickness of the actuation portion, an outer edge of the thin portion is shaped to include a plurality of first arcs each protruding toward an inside of the thin portion.

According to a second aspect of the present invention, there is provided an electrolytic capacitor including: a capacitor element; a case accommodating the capacitor element; a sealing member sealing the case; and the pressure valve of the first aspect, the pressure valve provided to the sealing member.

According to the first and second aspects, a single pressure valve is used as a valve for releasing internal gas both in normal use and in the case of a rapid increase in internal pressure.

To be more specific, in normal use, gas generated inside the case by flowing electric current, for example, is released to the outside through the thin portion, while in the case of the rapid increase in internal pressure, a central portion of the thin portion is broken to actuate the pressure valve.

This is because the thin portion is made of gas-permeable material and configured to be less likely to be broken with a relatively low internal pressure such as that in normal use (specifically, the outer edge of the thin portion is shaped to include the plurality of first arcs each protruding toward the inside of the thin portion, to have a rounded shape, which prevents local concentration of a stress onto a corner of the outer edge of the thin portion, and when the internal pressure is increased, the stress is not concentrated onto the outer edge of the thin portion but is effectively distributed). Meanwhile, in the case of the rapid increase in internal pressure, the central portion of the thin portion onto which the stress is concentrated is broken to actuate the pressure valve.

Therefore, according to the first and second aspects, the lifetime of the electrolytic capacitor is improved while restraining the number of parts for releasing the internal gas.

When viewed from the direction of the thickness of the actuation portion, the outer edge of the thin portion may be shaped to further include a plurality of second arcs each protruding toward an outside of the thin portion. This structure further imparts roundness to the outer edge of the thin portion, which ensures the prevention of the local concentration of the stress onto a corner of the outer edge of the thin portion, and when the internal pressure is increased, the stress is not concentrated onto the outer edge of the thin portion but is more effectively distributed.

When viewed from the direction of the thickness of the actuation portion, the outer edge of the thin portion may be shaped to be symmetrical with respect to a center line of the thin portion. With this structure, the stress is more effectively distributed all over the thin portion.

When viewed from the direction of the thickness of the actuation portion, the thin portion may have a cross-like shape. This structure provides an advantageous effect that the lifetime of the electrolytic capacitor is improved while restraining the number of parts for releasing the internal gas and preventing complication of the structure of the thin portion. Further, this structure offers good processability, as well as a longer boundary between the thin portion and the thick portion. This increases the area to be broken, ensuring the breakage of the thin portion.

When viewed from the direction of the thickness of the actuation portion, the actuation portion may have a circular shape. With this structure, the stress is more effectively distributed all over the actuation portion, leading to further improvement in the lifetime of the electrolytic capacitor.

The pressure valve of the first aspect may further include an annular supporter having a greater thickness than that of the thick portion, the annular supporter supporting the actuation portion on a periphery of the actuation portion. This structure ensures that the pressure valve is fixed in the case through the supporter.

Advantageous Effects of Invention

With the present invention, the lifetime of an electrolytic capacitor is improved while restraining the number of parts for releasing internal gas.

DESCRIPTION OF EMBODIMENTS

The following describes a preferred embodiment of the present invention, with reference to the drawings.

Figure 1A:
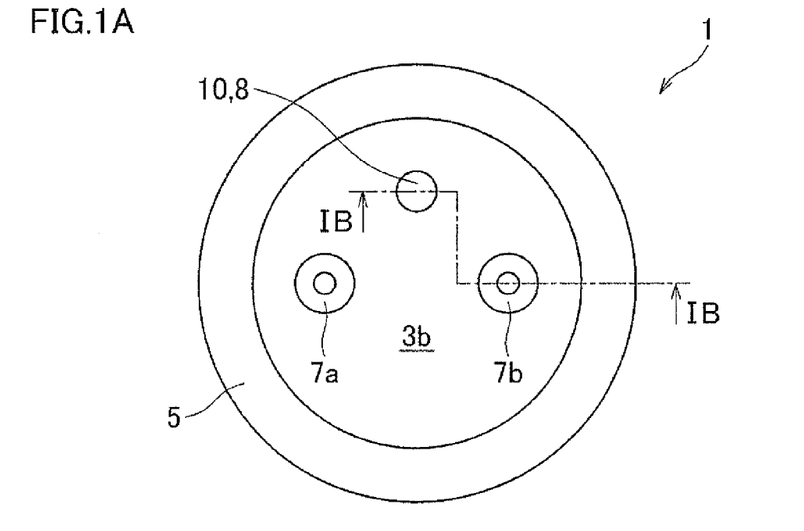
FIG. 1A is a plan view of an electrolytic capacitor of an embodiment of the present invention.
Figure 1B:
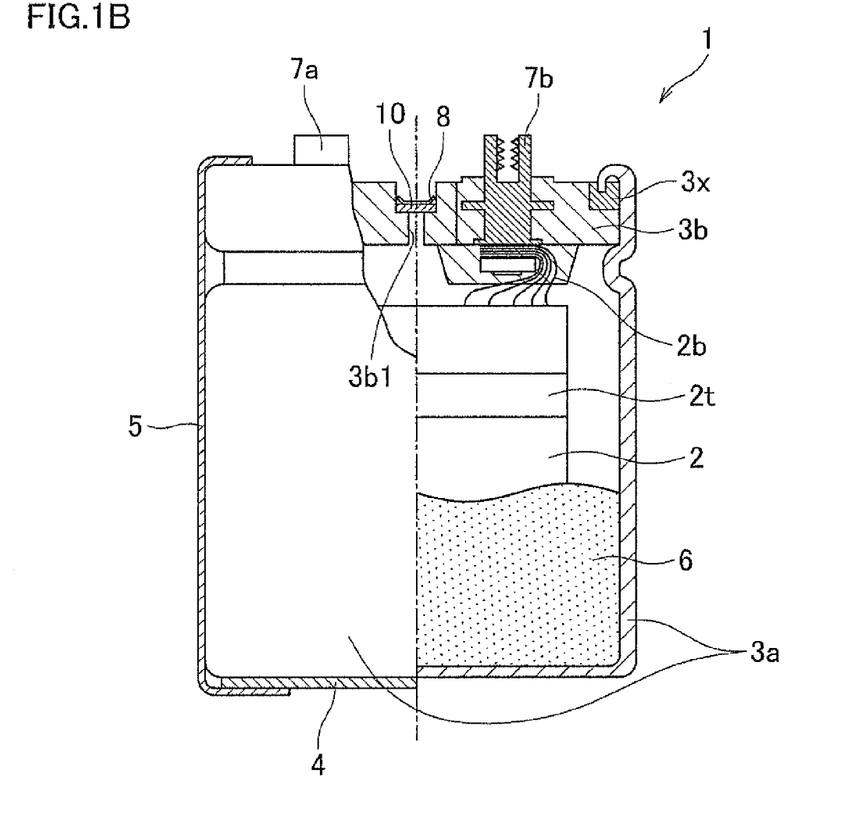
FIG. 1B is a partial sectional view of the overall structure of the electrolytic capacitor of the embodiment of the present invention, taken along a line IB-IB of FIG. 1A.

First, referring to FIGS. 1A and 1B, description will be given for the overall structure of an electrolytic capacitor 1 of an embodiment of the present invention. The electrolytic capacitor 1 includes a capacitor element 2, a case 3a, a sealing member 3b, a bottom plate 4, a sleeve 5, a fixing material 6, terminals 7a and 7b, and a pressure valve 10.

The case 3a accommodates the capacitor element 2, and the sealing member 3b is fitted in an opening of the case 3a. The sealing member 3b seals the case 3a. The case 3a is made of metal (such as aluminum), and the sealing member 3b is made of insulating material (such as a modified phenolic resin).

On the periphery of an upper portion of the sealing member 3b, a packing 3x made of elastic material (such as rubber) is provided. The packing 3x has a function of preventing the gas inside the case 3a from leaking through a gap between the sealing member 3b and the case 3a. An upper end of the case 3a is fixed into the packing 3x by caulking.

The bottom plate 4 is a circular film made of insulating material (such as flame-retardant polyester). The bottom plate 4 is disposed so as to overlap an under surface of a bottom of the case 3a. The sleeve 5 is a substantially cylindrical member made of insulating material (such as polyolefin). The sleeve 5 covers: a peripheral surface of the case 3a; a lower circumferential edge of the bottom plate 4, and an upper circumferential edge of the case 3a. A lower portion of the sleeve 5 is fixed to the bottom plate 4.

The fixing material 6, which fixes the capacitor element 2 in the case 3a, is made of a thermoplastic resin (such as polypropylene).

The terminals 7a and 7b and the pressure valve 10 are provided to the sealing member 3b. The terminals 7a and 7b are positioned apart from each other so as to be symmetrical with respect to the center of the sealing member 3b when viewed from a direction of the thickness of the sealing member 3b. The terminals 7a and 7b are made of metal (such as aluminum). The cathode terminal 7a is connected to cathode leads 2a of the capacitor element 2, while the anode terminal 7b is connected to anode leads 2b of the capacitor element 2.

The sealing member 3b has a through hole 3b1 which allows communication between the inside and the outside of the case 3a. The through hole 3b1 is formed between the center of the sealing member 3b when viewed from the direction of the thickness of the sealing member 3b (that is, the midpoint between the terminals 7a and 7b) and the outer edge of the sealing member 3b. The pressure valve 10 is provided so as to close the through hole 3b1. The pressure valve 10 is fixed to the sealing member 3b using a lock washer 8 provided on a top surface of the pressure valve 10. The pressure valve 10 has a function of releasing gas inside the case 3a.

Figure 2:
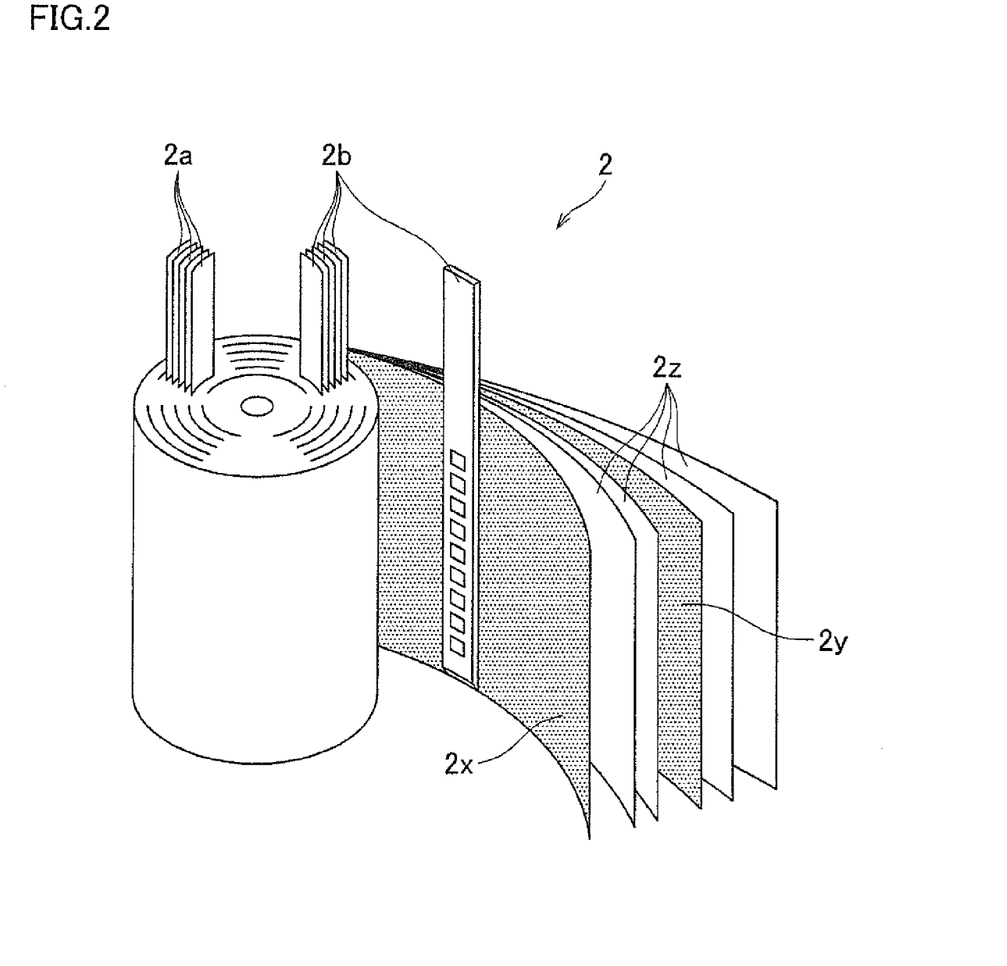
FIG. 2 is an exploded perspective view of a capacitor element.

Now, referring to FIG. 2, the structure of the capacitor element 2 will be described in detail.

The capacitor element 2 is formed by: rolling up cathode foil 2x and anode foil 2y to which the cathode leads 2a and the anode leads 2b are respectively attached, with a separator 2z being interposed between the cathode foil 2x and anode foil 2y; banding the thus formed roll by element banding tape 2t; and then impregnating the banded roll with an electrolyte. The separator 2z is made of insulating material, and may be kraft paper or the like. The cathode foil 2x and the anode foil 2y are formed by roughing the surface of aluminum foil, and the anode foil 2y has an anode oxide layer formed on its surface.

Next, referring to FIGS. 3A to 3D, the structure of the pressure valve 10 will be described in detail.

The pressure valve 10 has a substantially disc-like shape, and includes an actuation portion 11 and an annular supporter 12 which supports the actuation portion 11 on the periphery of the actuation portion 11. The pressure valve 10 is made of gas-permeable flexible material (such as silicone rubber). The actuation portion 11 and the supporter 12 of the pressure valve 10 are formed integrally with each other.

Figure 3A:
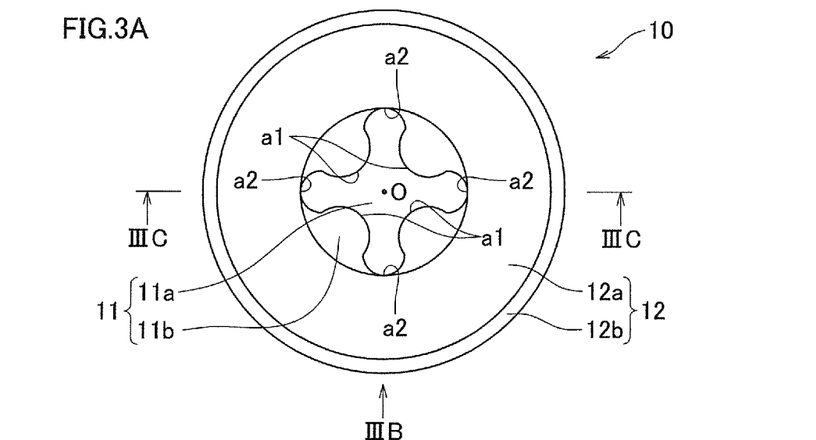
FIG. 3A is a plan view of a pressure valve of the embodiment of the present invention.
Figure 3B:
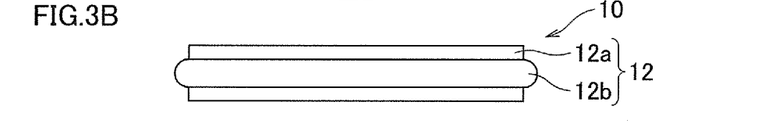
FIG. 3B is a side view of the pressure valve, viewed from a direction of an arrow 111B shown in FIG. 3A.

The actuation portion 11 has a circular shape when viewed from a direction of the thickness of the actuation portion 11 (a direction perpendicular to the sheet of FIG. 3A). The actuation portion 11 includes a thin portion 11a and a thick portion 11b provided in an outer region of the thin portion 11a and having a thickness greater than the thin portion 11a.

The thick portion 11b is thicker than the thin portion 11a in both directions along the direction of the thickness (i.e., in upward and downward directions in FIG. 3C), and the differences in thickness in the respective directions are the same as each other. When viewed from the direction of the thickness of the actuation portion 11, the thin portion 11a has a cross-like shape, while the outer edge of the thick portion 11b has a circular shape. The thick portion 11b is provided around the thin portion 11a so as to define the thin portion 11a.

When viewed from the direction of the thickness of the actuation portion 11, the outer edge of the thin portion 11a is shaped to include: a plurality of first arcs a1 each protruding toward a center O of the thin portion 11a (i.e., toward the inside of the thin portion 11a); and a plurality of second arcs a2 each protruding in a direction away from the center O of the thin portion 11a (i.e., toward the outside of the thin portion 11a). The second arcs a2 respectively form the ends of the cross, while the first arcs a1 form a crossover section of the cross. Each second arc a2 touches the outer edge of the thick portion 11b.

Figure 3C:
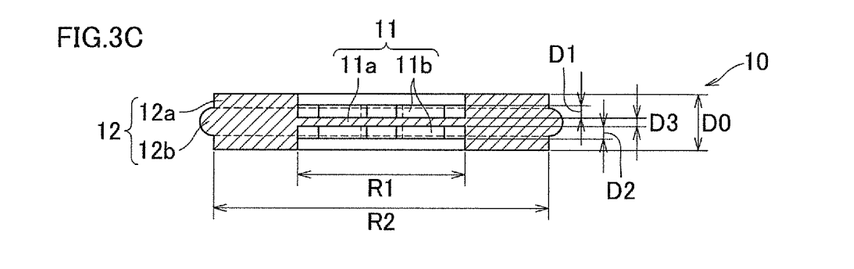
FIG. 3C is a sectional view of the pressure valve taken along a line IIIC-IIIC shown in FIG. 3A.
Figure 3D:
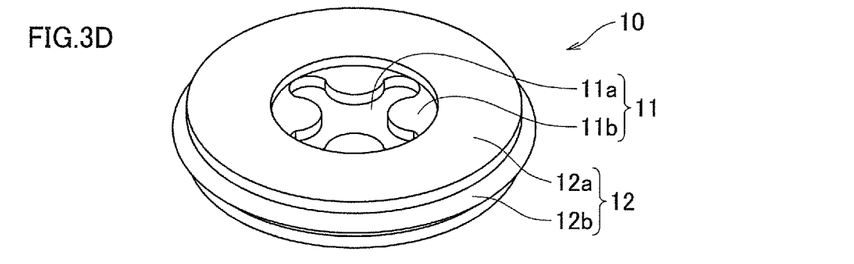
FIG. 3D is a perspective view of the pressure valve.

The supporter 12 is a member held by the sealing member 3b. The supporter 12 includes a main body 12a and a rib 12b. The thickness of the main body 12a is constant and greater than the thickness of the thick portion 11b. The thickness of the rib 12b is greater than the thickness of the thin portion 11a, and smaller than the thickness of the thick portion 11b.

The rib 12b protrudes outwardly from an outer circumferential surface of the main body 12a. The corners of the rib 12b are rounded off.

Since gas generated in the case 3a (internal gas) in normal use by the flowing electric current, for example, is generated gradually, the gas passes the through hole 3b1 to slowly press the pressure valve 10 from below, and when the pressure of the internal gas is increased to a first predetermined pressure or more, the gas permeates the thin portion 11a to be released to the outside of the case 3a.

On the other hand, when the pressure of the internal gas (internal pressure) is rapidly increased to a second predetermined pressure or more (the second predetermined pressure is larger than the first predetermined pressure), the thin portion 11a is deformed to bulge, and eventually, the thin portion 11a is cracked and broken. At this time, the thin portion 11a which is less stress-resistant is cracked first. Although the thick portion 11b can be deformed to some extent, the thick portion 11b is not cracked.

Example

Hereinafter, the present invention will be described more specifically with reference to Example.

Pressure valves used in Samples 1 to 3 of Example have the same structure as that of the pressure valve 10 of the above-described embodiment. The pressure valve is sized as follows (see FIG. 3C): R1 (the diameter of the actuation portion 11)=6 mm; R2 (the outer diameter of the main body 12a)=12 mm; D0 (the thickness of the main body 12a)=2 mm; D1 (the upward difference in thickness between the thick portion 11b and the thin portion 11a)=0.45 mm; D2 (the downward difference in thickness between the thick portion 11b and the thin portion 11a)=0.45 mm; and D3 (the thickness of the thin portion 11a)=0.3 mm. The rib 12b protrudes 0.5 mm from the main body 12a. The radius of a rounded portion of the rib 12b is 0.5 mm.

Figure 4A:
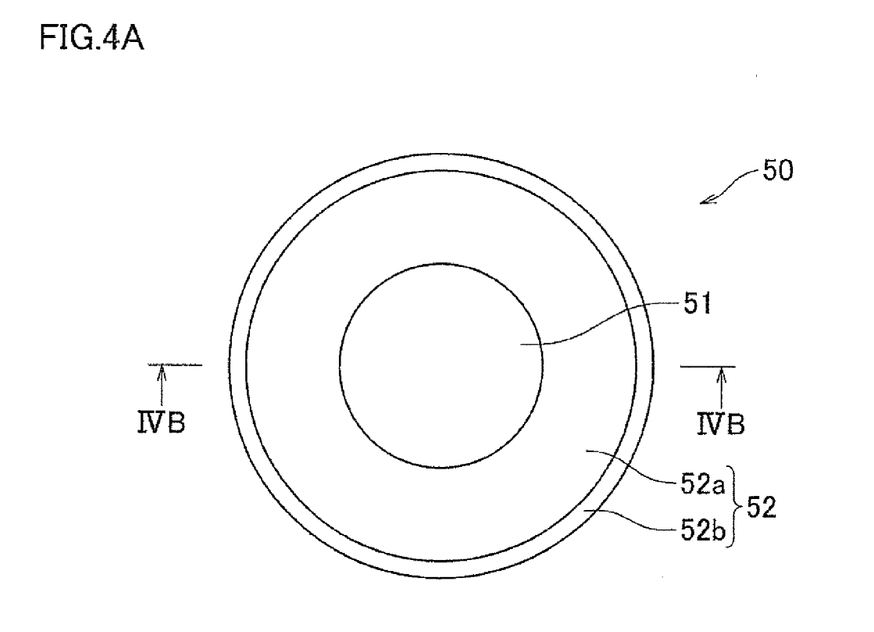
FIG. 4A is a plan view of a pressure valve of Comparative Example of the present invention.
Figure 4B:
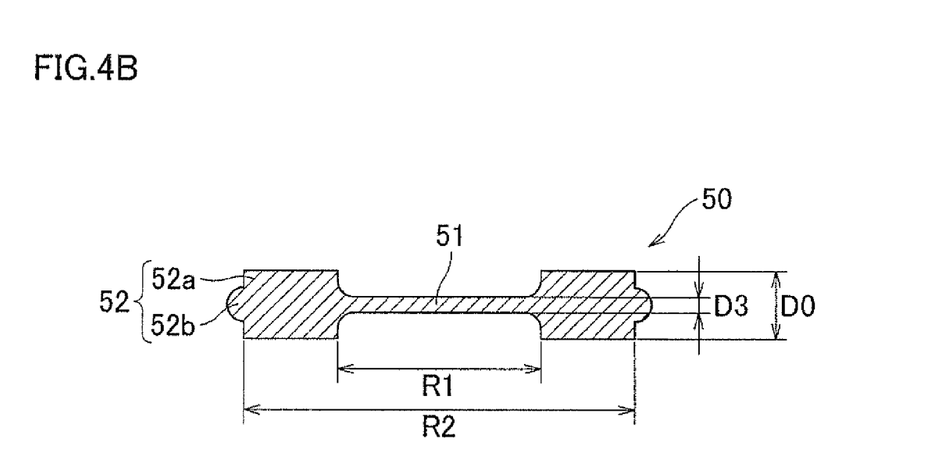
FIG. 4B is a sectional view of the pressure valve, taken along a line IVB-IVB shown in FIG. 4A.

Pressure valves used in Samples 1 to 3 of Comparative Example have the same structure as that of a pressure valve 50 shown in FIGS. 4A and 4B.

The pressure valve 50 has a substantially disc-like shape. The pressure valve 50 includes an actuation portion 51, and an annular supporter 52 which supports the actuation portion 51 on the periphery of the actuation portion 51.

The pressure valve 50 is made of gas-permeable flexible material (such as silicone rubber). The actuation portion 51 and the supporter 52 of the pressure valve 50 are formed integrally with each other.

The actuation portion 51 has a circular shape when viewed from a direction of the thickness of the actuation portion 51 (a direction perpendicular to the sheet of FIG. 4A), and the actuation portion 51 has a constant thickness.

The supporter 52 includes a main body 52a and a rib 52b. The thickness of the main body 52a is constant and greater than the thickness of the actuation portion 51. The thickness of the rib 52b is greater than the thickness of the actuation portion 51, and smaller than the thickness of the main body 52a.

The rib 52b protrudes outwardly from an outer circumferential surface of the main body 52a. The corners of the rib 52b are rounded off.

The pressure valve is sized as follows (see FIG. 4B): R1 (the diameter of the actuation portion 51)=6 mm; R2 (the outer diameter of the main body 52a)=12 mm; D0 (the thickness of the main body 52a)=2 mm; and D3 (the thickness of the actuation portion 51)=0.45 mm. The rib 52b protrudes 0.5 mm from the main body 52a. The radius of the rounded portion of the rib 52b is 0.5 mm. The radius of each rounded portion provided at the boundary between the actuation portion 51 and the supporter 52 is 0.2 mm.

Electrolytic capacitors used as Samples 1 to 3 of Example and Samples 1 to 3 of Comparative Example, in which the above-specified pressure valves are respectively provided, have: the diameter of 76 mm; the height of 140 mm; and the rated voltage of 450 V. The rated voltage was kept applied to these electrolytic capacitors at the ambient temperature of 115° C., to conduct a reliability test. Table 1 shows values of parameters before the test ("initial state") and after the application of the voltage for 2000 hours ("2000 hours later").

TABLE 1

| | CONFIGURATION OF ACTUATION PORTION | SAMPLE NO. | INITIAL STATE | | | | 2000 HOURS LATER | |
|---|---|---|---|---|---|---|---|---|
| | | | CAPACITANCE (μF) | DISSIPATION FACTOR | LEAKAGE CURRENT (μA) | WEIGHT OF ELECTROLYTIC CAPACITOR (g) | CAPACITANCE (μF) | CHANGE IN CAPACITANCE (%) |
| EXAMPLE | THIN PORTION (CROSS SHAPE WITH ARCS) + THICK PORTION | 1 | 4570 | 4.9 | 1264 | 919.4 | 4500 | −1.5 |
| | | 2 | 4580 | 5.0 | 1300 | 926.6 | 4510 | −1.5 |
| | | 3 | 4580 | 5.0 | 1291 | 931.6 | 4510 | −1.5 |
| COMPARATIVE EXAMPLE | DISC SHAPE (CONSTANT THICKNESS) | 1 | 4560 | 4.8 | 1241 | 918.1 | 4170 | −8.6 |
| | | 2 | 4600 | 4.7 | 1319 | 938.5 | 4520 | −1.7 |
| | | 3 | 4550 | 4.8 | 1509 | 932.0 | 4340 | −4.6 |

| | CONFIGURATION OF ACTUATION PORTION | SAMPLE NO. | 2000 HOURS LATER | | | | |
|---|---|---|---|---|---|---|---|
| | | | DISSIPATION FACTOR | LEAKAGE CURRENT (μA) | WEIGHT OF ELECTROLYTIC CAPACITOR (g) | CHANGE IN WEIGHT (g) | STATE OF ACTUATION PORTION |
| EXAMPLE | THIN PORTION (CROSS SHAPE WITH ARCS) + THICK PORTION | 1 | 8.3 | 471 | 916.4 | −3.0 | LARGE DEFORMATION |
| | | 2 | 9.2 | 500 | 923.1 | −3.5 | LARGE DEFORMATION |
| | | 3 | 8.2 | 442 | 928.3 | −3.3 | MEDIUM DEFORMATION |

TABLE 1-continued

| | | | | | | | |
|---|---|---|---|---|---|---|---|
| COMPARATIVE EXAMPLE | DISC SHAPE (CONSTANT THICKNESS) | 1 | 27.0 | 514 | 897.8 | −20.3 | BROKEN |
| | | 2 | 8.1 | 405 | 934.2 | −4.3 | LARGE DEFORMATION |
| | | 3 | 21.6 | 500 | 916.8 | −15.2 | BROKEN |

The "state of the actuation portion" was evaluated visually. It is shown that the weights of the electrolytic capacitors whose actuation portions were broken (Samples 1 and 3 of Comparative Example) were significantly decreased due to the release of the internal gas. On the other hand, in Samples 1 to 3 of Example, no actuation portion was broken, and the change in weight of each electrolytic capacitor was merely on the order of −3.5 g to −3.0 g, which corresponds to the gas having permeated the thin portion.

As shown in Table 1, no pressure valve was broken in Samples 1 to 3 of Example; however, the pressure valves were broken in two of the three Samples 1 to 3 of Comparative Example (that is, in Samples 1 and 3 of Comparative Example). This shows that the pressure valve of the present invention is more resistant to pressure than the pressure valve of Comparative Example, thereby to improve the lifetime of the electrolytic capacitor.

As described above, according to the pressure valve 10 and the electrolytic capacitor 1 of the above-described embodiment, a single pressure valve 10 is used as a valve for releasing internal gas both in normal use and in the case of a rapid increase in internal pressure.

To be more specific, in normal use, gas generated inside the case 3a for example by the flowing electric current is released to the outside through the thin portion 11a, while in the case of the rapid increase in internal pressure, the thin portion 11a is broken to actuate the pressure valve 10.

This is because the thin portion 11a is made of gas-permeable material and configured to be less likely to be broken with a relatively low internal pressure such as that in normal use (specifically, the outer edge of the thin portion 11a is shaped to include the plurality of first arcs a1 each protruding toward the inside of the thin portion 11a, to have a rounded shape, which prevents local concentration of a stress onto a corner of the outer edge of the thin portion 11a, and when the internal pressure is increased, the stress is not concentrated onto the outer edge of the thin portion 11a but is effectively distributed). Meanwhile, in the case of the rapid increase in internal pressure, a central portion of the thin portion 11a onto which the stress is concentrated is broken to actuate the pressure valve 10.

Thus, according to the above-described embodiment, the lifetime of the electrolytic capacitor 1 is improved while restraining the number of parts for releasing the internal gas.

When viewed from the direction of the thickness of the actuation portion 11, the outer edge of the thin portion 11a is shaped to further include the plurality of second arcs a2 each protruding toward the outside of the thin portion 11a. This structure further imparts roundness to the outer edge of the thin portion 11a, which ensures the prevention of the local concentration of the stress onto a corner of the outer edge of the thin portion 11a, and when the internal pressure is increased, the stress is not concentrated onto the outer edge of the thin portion 11a but is more effectively distributed.

When viewed from the direction of the thickness of the actuation portion 11, the outer edge of the thin portion 11a is shaped to be symmetrical with respect to the center O of the thin portion 11a. With this structure, the stress is more effectively distributed all over the thin portion 11a.

When viewed from the direction of the thickness of the actuation portion 11, the thin portion 11a has the cross-like shape. This structure provides an advantageous effect that the lifetime of the electrolytic capacitor 1 is improved while restraining the number of parts for releasing the internal gas and preventing complication of the structure of the thin portion 11a. Further, this structure offers good processability, as well as a longer boundary between the thin portion and the thick portion. This increases the area to be broken, ensuring the breakage of the thin portion.

When viewed from the direction of the thickness of the actuation portion 11, the actuation portion 11 has the circular shape. With this structure, the stress is more effectively distributed all over the actuation portion 11, leading to further improvement in the lifetime of the electrolytic capacitor 1.

The pressure valve 10 further includes the annular supporter 12 which has a greater thickness than that of the thick portion 11b and which supports the actuation portion 11 on the periphery of the actuation portion 11. This structure ensures that the pressure valve 10 is fixed in the case 3a through the supporter 12.

A preferred embodiment of the present invention has been described above. However, the present invention should not be narrowly interpreted within the limits of such embodiment, but rather may be applied in many variations within the scope of the claims.

The actuation portion and the supporter of the pressure valve do not have to be formed integrally with each other. The actuation portion and the supporter may be formed separately from each other and then joined together.

In the pressure valve, the actuation portion may be provided without the supporter.

The actuation portion may have any shape other than the circular shape. For example, the actuation portion may have an oval shape.

The thin portion may have any shape other than the cross-like shape. For example, the thin portion may have a shape similar to the Chinese character "big" (pronounced "dai" in Japanese), a Y-shape, a T-shape, an X-shape, a K-shape, a radial shape, a polygonal shape, a shape formed by a combination of cross-like shapes or a combination of one or more of these listed shapes, or the like.

Further, in the above-described embodiment, the outer edge of the thin portion is shaped to be symmetrical with respect to a center line of the thin portion (a line passing through the center of the thin portion) when viewed from the direction of the thickness of the actuation portion, and to be symmetrical with respect to the center O of the thin portion; however, the outer edge does not have to be shaped to be symmetrical with respect to the center line or the center of thin portion.

In the above-described embodiment, the differences in thickness between the thick portion and the thin portion in the both directions along the direction of the thickness are the same as each other; however, the difference in each direction may be arbitrarily determined.

The materials for the pressure valve and the materials for the components of the electrolytic capacitor are not limited to those mentioned above.

REFERENCE SIGNS LIST 1 electrolytic capacitor
2 capacitor element
3a case
3b sealing member
10 pressure valve
11 actuation portion
11a thin portion
11b thick portion
12 supporter
a1 first arc
a2 second arc
O center

The invention claimed is:

1. A pressure valve for an electrolytic capacitor, the pressure valve being provided in a sealing member that seals a case accommodating a capacitor element in the electrolytic capacitor, the pressure valve being configured to release gas generated in the case, the pressure valve comprising:
an actuation portion including: (i) a thin portion extending in an orthogonal direction that is orthogonal to release direction of gas that is released from the case, and (ii) a thick portion adjacent to the thin portion in the orthogonal direction and having a thickness greater than that of the thin portion in the release direction, and
an annular supporter having a greater thickness than that of the thick portion in the release direction and being adjacent to the actuation portion in the orthogonal direction, the annular supporter supporting the actuation portion on a periphery of the actuation portion, wherein:
in the actuation portion, at least the thin portion is made of gas-permeable material;
when viewed from the release direction, an outer edge of the thin portion is shaped to include a plurality of first arcs each protruding toward an interior of the thin portion; and
the actuation portion and the annular portion are formed integrally with each other.

2. The pressure valve according to claim 1, wherein when viewed from the release direction, the outer edge of the thin portion is shaped to further include a plurality of second arcs each protruding toward an outside of the thin portion.

3. The pressure valve according to claim 1, wherein when viewed from the release direction, the outer edge of the thin portion is shaped to be symmetrical with respect to a center line of the thin portion.

4. The pressure valve according to claim 1, wherein when viewed from the release direction, the thin portion has a cross-like shape.

5. The pressure valve according to claim 1, wherein when viewed from the release direction, the actuation portion has a circular shape.

6. An electrolytic capacitor comprising:
a capacitor element;
a case accommodating the capacitor element;
a sealing member sealing the case; and
the pressure valve as claimed in claim 1, the pressure valve being provided in the sealing member.

* * * * *